(12) United States Patent
Liu et al.

(10) Patent No.: US 11,048,442 B2
(45) Date of Patent: Jun. 29, 2021

(54) SCALABLE IN-MEMORY OBJECT STORAGE SYSTEM USING HYBRID MEMORY DEVICES

(71) Applicant: Huazhong University of Science and Technology, Hubei (CN)

(72) Inventors: Haikun Liu, Hubei (CN); Xiaofei Liao, Hubei (CN); Hai Jin, Hubei (CN); Zhiwei Li, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 16/774,039

(22) Filed: Jan. 28, 2020

(65) Prior Publication Data
US 2020/0333981 A1    Oct. 22, 2020

(30) Foreign Application Priority Data

Apr. 18, 2019   (CN) .......................... 201910315354.8

(51) Int. Cl.
*G06F 3/06* (2006.01)

(52) U.S. Cl.
CPC .......... *G06F 3/0659* (2013.01); *G06F 3/0604* (2013.01); *G06F 3/064* (2013.01); *G06F 3/068* (2013.01); *G06F 3/0622* (2013.01); *G06F 3/0631* (2013.01); *G06F 3/0653* (2013.01); *G06F 3/0679* (2013.01)

(58) Field of Classification Search
CPC .... G06F 3/0604; G06F 3/0622; G06F 3/0631; G06F 3/064; G06F 3/0653; G06F 3/0659; G06F 3/0679; G06F 3/068; G06F 9/5016; G06F 12/0238; G06F 12/0246; G06F 2212/7202
See application file for complete search history.

(56) References Cited

U.S. PATENT DOCUMENTS

| | | | |
|---|---|---|---|
| 10,198,352 B2* | 2/2019 | Subrahmanyam .... | G06F 9/4493 |
| 2017/0062025 A1* | 3/2017 | Kim ..................... | G06F 13/1684 |
| 2017/0109080 A1* | 4/2017 | Liu ............................ | G06F 9/38 |
| 2017/0115896 A1* | 4/2017 | Brouer ................. | G06F 3/0614 |
| 2019/0340120 A1* | 11/2019 | Gokita .................... | G06F 3/061 |
| 2020/0310985 A1* | 10/2020 | Li ....................... | G06F 12/0871 |

* cited by examiner

*Primary Examiner* — Larry T Mackall
(74) *Attorney, Agent, or Firm* — Michael X. Ye; Morris, Manning & Martin, LLP (57) ABSTRACT

The present invention is related to a storage system of scalable storage for in-memory objects using a DRAM-NVM hybrid memory devices.

7 Claims, 3 Drawing Sheets

SCALABLE IN-MEMORY OBJECT STORAGE SYSTEM USING HYBRID MEMORY DEVICES

FIELD

The present invention is related to computer storage, and more particularly to performance optimization of hybrid memory devices for special applications, and even more particularly to a scalable storage system for in-memory objects using hybrid memory devices.

DESCRIPTION OF RELATED ART

In the modern network-based service architecture, memory object storage systems have become a vital part. Such a system stores all performance-sensitive data in its memory in order to accelerate data access by orders of magnitude as compared to disks. However, with the development of network servers, dynamic random access memories (DRAMs), due to their power consumption and technical limits, have become incompetent for memory object storage systems with increasingly large capacity requirements. Thus, non-volatile memories (NVMs) are developed as a solution to this issue. This novel kind of memory devices has advantages such as byte addressability, no static power consumption, and high density. Nevertheless, this kind of memory devices has its disadvantages, including high reading/writing power consumption, low reading/writing speed and short service life as compared to DRAMs. Therefore, the present mainstream of memory design is to combine a dynamic random access memory (DRAM) and a non-volatile memory (NVM) in to a hybrid memory device, so as to enjoy low access delay attributable to the DRAM as well as low power consumption and high capacity attributable to the NVM. Slab-based allocation mechanisms are also referred to slab allocation mechanisms and achievable using a slab memory allocator. It was first introduced as an allocation mechanism used in Linux operating systems, and designed for objects frequently being distributed and released, such as process descriptors. These objects are typically small in size, and when distributed and released using a buddy allocation mechanism, can cause a large number of memory fragments and slow processing. A slab-based allocation mechanism provides allocation based on object sizes, through which a memory is divided into a series of slab classes, each corresponding to allocation of an exclusive range of sizes of memory chunks. For allocating a memory chunk, the slab-based allocation mechanism selects one of the slab classes to perform memory allocation according to the required memory chunk size. Such a slab-based allocation mechanism has been extensively used in memory object storage systems, such as Memcached.

With the disadvantages of high reading/writing delay and energy consumption and short lifetime, a non-volatile memory when used in a hybrid memory system requires a certain management mechanism to place frequently accessed data in DRAM and place less frequently accessed data in NVM of the system. There have been some studies conducted on management mechanisms for hybrid memory devices from the perspectives of hardware, operating systems and applications. The core concept is realized by selecting a certain data granularity, using real-time counting to identify how frequently data are accessed and dynamically moving data with high access frequency to DRAM while migrating data with low access frequency to NVM. The hardware-level strategy sets a granularity down to individual physical pages and dynamically migrates pages by altering the organizing and scheduling schemes of the memory controller. The OS-level strategy sets a granularity down to individual virtual pages and performs dynamic migration through monitoring the access frequency of each virtual page in the operating system. The foregoing hardware-level and OS-level management, however, is at the maximum the second best data placement strategy. This is mainly because that a single page may contain data objects having different access frequencies and this strategy is not capable of recognizing such a case. One example is a high-efficiency dynamic page scheduling method based on a hybrid memory structure as disclosed in China Patent Publication No. CN107193646A. This known method is used in a parallel-storage memory controller comprising a first storage medium and second storage medium. Particularly, each of the storage mediums is configured with an access list, and the memory controller is configured with respect stacks for the storage media. Then dynamic management is performed on the pages recently accesses in the storage media according to the state marks of pages as recorded in the stacks and the counts of reading/writing accesses as recorded in the access lists, so as to place the pages having high writing hotness in the first storage medium and place the pages having high reading frequency in the second storage medium, wherein the first storage medium is a DRAM and the second storage medium is an NVM. The method can accurately use access history and is suitable for application scenarios with relatively low locality, so as to significantly reduce invalid page migration between the memory media, thereby enhancing memory utilization rate and hit rate. However, the known method has the foregoing shortcomings.

Hence, improvement in the prior art is necessary.

SUMMARY OF THE INVENTION

In view of the shortcomings of the prior art, the present invention provides a scalable storage system and method for in-memory objects using hybrid memory devices. The present invention monitors the access hotness information of each said memory object at the application level and accordingly adjusts the storage destination for key-value data corresponding to each memory object dynamically, thereby realizing dynamic use of a DRAM/NVM hybrid memory device, and saving huge costs for hardware and for the operating system used in the traditional method that monitors access hotness at the hardware level or OS level.

According to one preferred embodiment, a method of scalable storage for in-memory objects using hybrid memory devices, it particularly relates to a method of storage for in-memory using hybrid memory devices, that the said hybrid memory device comprises a dynamic random access memory (DRAM) and a non-volatile memory (NVM), wherein the method comprising steps of: executing an operation of allocating the memory device using a slab-based allocation mechanism, the allocation mechanism including a plurality of slab classes, and each said slab class being responsible to allocate memory chunks of a fixed size, and to divide each slab class into a DRAM domain and a NVM domain; monitoring an access count of each said memory object at an application level and obtaining access hotness information of each said memory object at least based on the access count of each said memory object; and/or dynamically adjusting a storage destination for corresponding key-value data in each slab class based on the access hotness information of each said memory object, so as to store the key-value data of the memory objects having relatively high access hotness in each said slab class into the DRAM domain, and store the key-value data of the memory objects having relatively low access hotness in each said slab class into the NVM domain.

According to one preferred embodiment, the process of dynamically adjusting the storage destination for the corresponding key-value data in each said slab class based on the access hotness information of each said memory object further comprises: when the access count recorded in an access count field of the corresponding memory object exceeds the hotness threshold of the corresponding slab class, migrating the key-value data of the corresponding memory object in the NVM domain of the slab class to the DRAM domain of the slab class; and/or when a memory space in the DRAM domain of the corresponding slab class is insufficient for the key-value data of a said memory object that newly comes, expelling the key-value data of the memory object having the lowest access hotness in the DRAM domain of the slab class to the NVM domain of the same slab class.

According to one preferred embodiment, the method further comprises: storing metadata and the key-value data of each said memory object separately, so that the metadata are stored in the DRAM and the key-value data are stored in a DRAM/NVM hybrid memory pool, in which one part of the DRAM dedicatedly stores the metadata, while another part of the DRAM and the non-volatile memory jointly form the DRAM/NVM hybrid memory pool.

According to one preferred embodiment, each said slab class has a corresponding said hotness threshold, and the hotness thresholds for different said slab classes are independent of each other.

According to one preferred embodiment, the method comprising a step of sorting the memory objects in the DRAM domain and in the NVM domain of each said slab class, respectively, in terms of access hotness adopting a multi-queue strategy, so as to obtain the access hotness information of each said memory object, and wherein the step comprises: maintaining a multi-queue structure for each said slab class for management of the memory objects in the DRAM domain and in the NVM domain of the slab class; given that the multi-queue structure is a 16-levels queue structure, with the levels numbered 0~15, respectively, placing the memory objects having values of the access count field ranging between $2^i$ and $2^{i+1}$ in the $i^{th}$-level queue, and placing all the memory objects having the values greater than $2^{15}$ in the $15^{th}$-level queue, wherein the memory objects in the higher level have the higher access hotness; given that each said queue is a least recently used linked list, placing each said memory object just accessed at a top of the linked list, so that a bottom of the linked list corresponds to the memory object that has the lowest access hotness in the current queue; and taking a sort result of each said memory object in the multi-queue structure in terms of access hotness as the access hotness information.

According to one preferred embodiment, the method further comprising a step of dynamically adjusting the hotness threshold of the corresponding slab class using a hill climbing algorithm, and wherein the step comprises: cyclically collecting an average of the access counts of the memory objects in the DRAM domain of each said slab class using the hill climbing algorithm, so as to dynamically adjust the hotness threshold of the slab class accordingly; where the average of the access counts of the memory objects in the DRAM domain of the slab class corresponding to a current cycle is greater than the average of the access counts of the memory objects in the DRAM domain of the slab class in a previous cycle, keeping adjustment in the hotness threshold for the current cycle consistent with adjustment in the hotness threshold for the previous cycle; and/or where the average of the access counts of the memory objects in the DRAM domain of the slab class corresponding to the current cycle is smaller than or equal to the average of the access counts of the memory objects in the DRAM domain of the slab class in the previous cycle, making the adjustment in the hotness threshold for the current cycle opposite to the adjustment in the hotness threshold for the previous cycle.

According to one preferred embodiment, the method further comprises steps of: cyclically monitoring a utilization rate of DRAM caused by each said slab class; calculating an optimal DRAM allocation value for each said slab class accordingly; and/or dynamically re-allocating available DRAM capacity for each said slab class according to the optimal DRAM allocation value for each said slab class.

According to one preferred embodiment, after dynamically re-allocating the available DRAM capacity for each said slab class according to the optimal DRAM allocation value for each said slab class, using a product of multiplying the access count of each said memory object in all the slab classes by an attenuation coefficient to update the access count of the memory object, wherein the attenuation coefficient $\in [0.1, 0.9]$, so as to ensure that the memory objects satisfying the hotness threshold are indeed those having relatively high access hotness in a current time period.

According to one preferred embodiment, dynamically re-allocating the available DRAM capacity for each said slab class according to the optimal DRAM allocation value for each said slab class is performed in a cyclical manner;

enabling a background thread to execute DRAM re-allocation according to the optimal DRAM allocation value, so as to dynamically re-allocate the available DRAM capacity for each said slab class according to the optimal DRAM allocation value for each said slab class; wherein, the optimal DRAM allocation value for each said slab class is obtained using an Equation 1, an Equation 2 and an Equation 3 together:

in which the Equation 1 is:

$$\text{Cost}[i][j] = \left(\sum_{k=1}^{T} a[k] - \sum_{k=1}^{t} a[k]\right) * S[i],$$

where Cost[i][j] represents a cost of a system implementing the method caused by the $i^{th}$ slab class when the DRAM capacity allocated to the $i^{th}$ slab class is j, where $1 \leq i \leq N$, $0 \leq j \leq D$; N represents a number of slab classes currently existing in the system; D represents a total DRAM capacity of the present system, T represents a count of the memory objects, the access counts corresponding to the memory objects are expressed as a[1] through a[T] in a descending order of the access counts; t represents a total number of the memory objects the DRAM accommodates, and S[i] represents the size of the memory chunks allocated to the memory objects by the slab class;

the Equation 2 is:

$$TotalCost = \sum_{i=1}^{N} \text{Cost}[i][d[i]],$$

where d[i] represents the DRAM capacity allocated to the $i^{th}$ slab class by the system, where $0 \leq d[i] \leq D$; and
the Equation 3 is:

$$\sum_{i=1}^{N} d[i] = D,$$

for which a sets of d[i] is calculated using a dynamic programming algorithm so that the set of d[i] minimizes a TotalCost value while upholding Equation 3 and that a value of the set of d[i] is the optimal DRAM allocation value of each said slab class.

Preferably, DRAM stands for Dynamic Random Access Memory.

According to one preferred embodiment, a storage system of scalable storage for in-memory objects using hybrid memory devices, it particularly relates to a storage system of storage for memory using a hybrid memory, the said system comprises a dynamic random access memory (DRAM) and a non-volatile memory (NVM), wherein the system is configured to: execute an operation of allocating the memory device using a slab-based allocation mechanism, the allocation mechanism including a plurality of slab classes, and each said slab class being responsible to allocate memory chunks of a fixed size, and to divide each slab class into a DRAM domain and a NVM domain; monitor an access count of each said memory object at an application level and obtaining access hotness information of each said memory object at least based on the access count of each said memory object; and/or dynamically adjust a storage destination for corresponding key-value data in each slab class based on the access hotness information of each said memory object, so as to store the key-value data of the memory objects having relatively high access hotness in each said slab class into the DRAM domain, and store the key-value data of the memory objects having relatively low access hotness in each said slab class into the NVM domain.

According to one preferred embodiment, a computer system that comprises: a DRAM and a NVM, and the system is configured to: monitor an access count of each said memory object at an application level and obtaining access hotness information of each said memory object at least based on the access count of each said memory object; and/or dynamically adjust a storage destination for corresponding key-value data in each slab class based on the access hotness information of each said memory object, so as to store the key-value data of the memory objects having relatively high access hotness in each said slab class into the DRAM domain, and store the key-value data of the memory objects having relatively low access hotness in each said slab class into the NVM domain.

According to one preferred embodiment, the system is configured to: execute an operation of allocating the memory device using a slab-based allocation mechanism, the allocation mechanism including a plurality of slab classes, and each said slab class being responsible to allocate memory chunks of a fixed size, and to divide each slab class into a DRAM domain and a NVM domain.

According to one preferred embodiment, the process of dynamically adjusting the storage destination for the corresponding key-value data in each said slab class based on the access hotness information of each said memory object further comprises: when the access count recorded in an access count field of the corresponding memory object exceeds the hotness threshold of the corresponding slab class, migrating the key-value data of the corresponding memory object in the NVM domain of the slab class to the DRAM domain of the slab class; and/or when a memory space in the DRAM domain of the corresponding slab class is insufficient for the key-value data of a said memory object that newly comes, expelling the key-value data of the memory object having the lowest access hotness in the DRAM domain of the slab class to the NVM domain of the same slab class.

According to one preferred embodiment, each slab class has a corresponding hotness threshold, and the hotness thresholds for different said slab classes are independent of each other.

According to one preferred embodiment, the system is further configured to: dynamically adjust the hotness threshold of the corresponding slab class using a hill climbing algorithm.

According to one preferred embodiment, the system is further configured to: cyclically monitor a utilization ratio of DRAM caused by each said slab class and calculate an optimal DRAM memory allocation value for each said slab class accordingly; and/or dynamically re-allocate available DRAM memory capacity for each said slab class according to the optimal DRAM memory allocation value for each said slab class.

According to one preferred embodiment, the system is further configured to: dynamically re-allocating the available DRAM memory capacity for each said slab class according to the optimal DRAM memory allocation value for each said slab class is performed in a cyclical manner.

The present invention provides a scalable storage system and method for in-memory objects using hybrid memory devices, and has at least the following advantages:

First, the present invention realizes dynamic utilization of DRAM/NVM hybrid memory devices by monitoring access hotness of memory objects at the application level, and can save huge costs for hardware and for the operating system used in the traditional method that monitors access hotness at the hardware level or OS level.

Second, the present method enhances utilization ratio of limited DRAM capacity through DRAM re-allocation across slab classes, dynamic adjustment of the hotness threshold based on the hill climbing algorithm, and management of memory objects in DRAM and NVM domains based on the multi-queue strategy.

DETAILED DESCRIPTION OF THE INVENTION

Detailed description will be given below with reference to the drawings 1, 2, 3 and 4.

According to one preferred embodiment, the present embodiment discloses a scalable method for storing memory objects 100 using hybrid memory devices, or a hybridmemory-based storing method. The method may by embodied using a system disclosed herein and/or alternative components. For example, the disclosed method of the present invention may be embodied using some of the components of the disclosed system of the present invention.

According to one preferred embodiment, the hybrid memory device may be a mixed memory medium composed of DRAM and NVM. As used herein, the term "scalable" describes that the present invention make more available memory capacity by using a hybrid memory device than the DRAM-based prior art.

According to one preferred embodiment, the hybrid memory device may comprise a dynamic random access memory 200 and a non-volatile memory 300. The disclosed method comprises at least one of the following steps: allocating the memory device using a slab allocation mechanism, the allocation mechanism including a plurality of slab classes, and each said slab class being configured to allocate memory chunks of a fixed size, and to divide each slab class into a DRAM domain and an NVM domain; monitoring an access count of each said memory object 100 at an application-level and obtaining access hotness information of each said memory object at least based on the access count of each said memory object; and/or dynamically adjusting a storage destination for corresponding key-value data in each slab class based on the access hotness information of each said memory object 100, so as to store the key-value data of the memory objects 100 having relatively high access hotness in each said slab class into the DRAM domain, and store the key-value data of the memory objects 100 having relatively low access hotness in each said slab class into the NVM domain. Or, the storage destination for corresponding key-value data in each slab class is dynamically adjusted according to the access hotness information of the memory object 100, so that the key-value data of the memory objects 100 in each slab class that have relatively high frequency of access are stored in the DRAM domain, and the key-value data of the other memory objects 100 in each slab class are stored in the NVM domain. Preferably, every slab class is the only one of its kind. Preferably, the access count may be referred to the total times of the memory object 100 accessed by GET/SET requests. The access count is recorded in an access count field 117 of metadata 110 of the memory object 100. Every time the memory object 100 is accessed by a GET/SET request, the value in the corresponding access count field 117 is incremented by 1. The term "GET/SET request" refers herein to the means by which a user accesses a memory object from the memory object storage system, wherein a GET request is made for reading the data of a memory object, and a SET request is made for altering the data of a memory object.

According to another feasible embodiment, the disclosed method may comprise at, least one of the following steps:
building a DRAM/NVM hybrid memory pool using a memory allocator;
building a slab-based allocation mechanism for memory allocation so as to divide each slab class into a DRAM domain and an NVM domain;
monitoring the access hotness information of all the memory objects 100;
based on the access hotness information of each memory object 100 in each slab class, dynamically adjusting the storage destination of the corresponding key-value data, so that the DRAM domain of each slab class stores the key-value data of the memory object 100 having relatively high access hotness in that slab class and the NVM domain of each slab class stores the key-value data of the memory object 100 having relatively low access hotness in that slab class;
wherein there are at least two slab classes, each one for allocating memory chunks of a specific size, and each one having a DRAM domain and an NVM domain;
cyclically monitoring a utilization ratio of DRAM caused by each slab class and calculating an optimal DRAM allocation value for each slab class accordingly; and/or
dynamically re-allocating available DRAM capacity for each slab class according to the optimal DRAM allocation value for each slab class.

According to one preferred embodiment, the step of dynamically adjusting the storage destination for the corresponding key-value data in each said slab class based on the access hotness information of each said memory object 100 further comprises at least one of the following steps of: when the access count recorded in an access count field of the corresponding memory object 100 exceeds a hotness threshold of the corresponding slab class, migrating the key-value data of the corresponding memory object 100 in the NVM domain of the slab class to the DRAM domain of the slab class; and when a memory space in the DRAM domain of the corresponding slab class is insufficient for the key-value data of a said memory object 100 that newly comes, expelling the key-value data of the memory object 100 having the lowest access hotness in the DRAM domain of the slab class to the NVM domain of the same slab class.

According to one preferred embodiment, each said slab class has a corresponding said hotness threshold. Preferably, the hotness thresholds for different said slab classes are independent of each other. The present invention thereby can at least provide the following beneficial technical effects. Since the system may have different access needs for memory objects 100 in different slab classes, it is desirable to set a dedicated hotness threshold for each of the slab classes so that the different access needs of the system for accessing the memory objects 100 in different slab classes can be met, thereby ensuring that the system accesses the memory objects 100 with relatively high access hotness in the slab class efficiently.

According to one preferred embodiment, a step of dynamically adjusting a storage destination for corresponding key-value data in each slab class based on the access hotness information of each memory object 100, the step may comprise: sorting the memory objects 100 in the DRAM domain and in the NVM domain of each slab class, respectively, in terms of access hotness using a multi-queue strategy, so as to obtain the access hotness information of each memory object 100. Preferably, the term "access hotness information" may be referred to the result of relative ordering of access hotness of the corresponding memory objects in the multi-queue structure.

Figure 3:
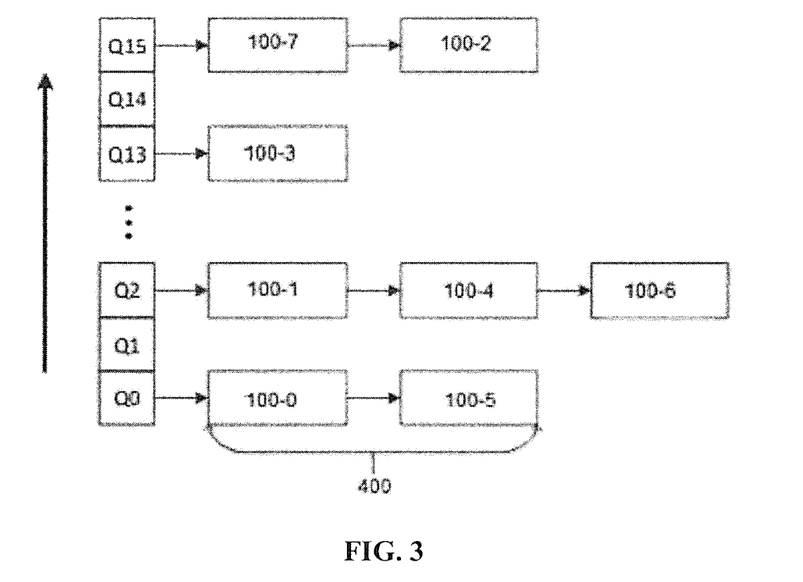
FIG. 3 illustrates a multi-queue strategy architecture according to the present invention.

According to one preferred embodiment, a step of sorting the memory objects in the DRAM domain and in the NVM domain of each said slab class, respectively, in terms of access hotness adopting a multi-queue strategy, so as to obtain the access hotness information of each said memory object 100, and the step comprises at least one of the following steps of maintaining a multi-queue structure for each said slab class for management of the memory objects 100 in the DRAM domain and in the NVM domain of the slab class; given that the multi-queue structure is a 16-levels queue structure, with the levels numbered 0~15, respectively, placing the memory objects having values of the access count field ranging between $2^i$ and $2^{i+1}$ in the $Qi^{th}$-level queue, and placing all the memory objects 100 having the values greater than $2^{15}$ in the $Q^{15}$-level queue, wherein the memory objects 100 in the higher level have the higher access hotness; and/or given that each said queue is a least recently used linked list 400, placing each said memory object 100 just accessed at a top of the linked list, so that a bottom of the linked list corresponds to the memory object 100 that has the lowest access hotness in the current queue. Preferably, the access hotness ordering results in multi-level queues of the memory objects 100 in the DRAM domain and in the NVM domain of each slab class are taken as the access hotness information. Therein, they memory objects 100 in the queues of higher levels have the greater access hotness. In the queues of the same level, the memory objects 100 closer to the top of the queue has the greater access hotness, and otherwise, has the lower access hotness. FIG. 3 shows sixteen levels of queues numbered Q0~Q15 and also shows several memory objects 100. To keep simplicity, only the Q0-level, Q1-level, Q2-level, Q13-level, Q14-level and Q15-level queues are depicted while the other queues are represented by an ellipsis. For easy differentiation, each memory object is connected with a suffix as an exclusive number through a hyphen. As shown, 100-0~100-7 represent 8 different memory objects. Particularly, 100-0, 100-1, 100-2, 100-3, 100-4, 100-5, 100-6 and 100-7 represents the first, second, third, fourth, fifth, sixth, seventh and eighth memory objects, respectively. In the Q0-level queue, 100-0 and 100-5 form a least recently used linked list 400. As shown in FIG. 3, the value of access hotness increases gradually in the direction indicated by the arrow at the left. In other words, the Q0-level queue has the lowest value of access hotness and the Q15-level queue has the greatest value of access hotness. Assuming that the multi-queue structure of FIG. 3 has 100 memory objects in total, the access hotness information of the eighth memory object 100-7 is 1/100, representing the greatest access hotness. The access hotness information of the third access object 100-2 is 2/100. The access hotness information of the sixth memory object 100-5 is 100/100, representing the lowest access hotness.

According to one preferred embodiment, a step of dynamically adjusting the hotness threshold of the corresponding slab class using a hill climbing algorithm, and the step comprises at least one of the following steps of: cyclically collecting an average of the access counts of the memory objects 100 in the DRAM domain of each said slab class using the hill climbing algorithm, so as to dynamically adjust the hotness threshold of the slab class accordingly; where the average of the access counts of the memory objects 100 in the DRAM domain of the slab class corresponding to a current cycle is greater than the average of the access counts of the memory objects 100 in the DRAM domain of the slab class in a previous cycle, keeping adjustment in the hotness threshold for the current cycle consistent with adjustment in the hotness threshold for the previous cycle; and/or where the average of the access counts of the memory objects 100 in the DRAM domain of the slab class corresponding to the current cycle is smaller than or equal to the average of the access counts of the memory objects 100 in the DRAM domain of the slab class in the previous cycle, making the adjustment in the hotness threshold for the current cycle opposite to the adjustment in the hotness threshold for the previous cycle. For example, preferably, given that the hotness threshold of the current slab class is taken as the threshold, the average access count of the memory objects 100 in the DRAM domain of the previous cycle is last_count, and the average access count of the memory objects 100 in the DRAM domain for the current cycle is curr_count. In this case, if curr_count>last_count, it indicates that the adjustment in the threshold for the previous cycle is beneficial, so the adjustment in the threshold for the current cycle remains the same as that for the previous cycle. In other words, if the threshold was lowered in the previous cycle, it is also lowered in the current cycle by decrementing the threshold by 1. If the threshold was increased in the previous cycle, it is increased in the current cycle. Otherwise, the threshold adjustment for the current cycle should be opposite to that for the previous cycle.

According to one preferred embodiment, the method further comprises: cyclically monitoring a utilization rate of DRAM caused by each said slab class; calculating an optimal DRAM allocation value for each said slab class accordingly; and dynamically re-allocating available DRAM capacity for each said slab class according to the optimal DRAM allocation value for each said slab class.

Figure 1:
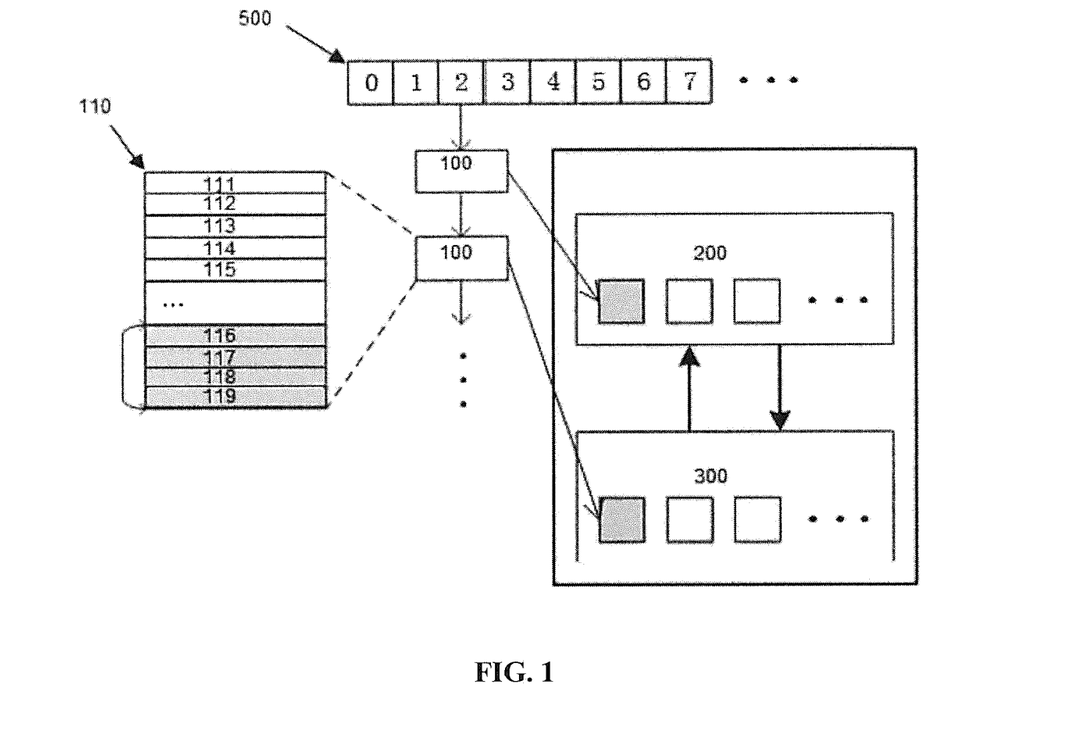
FIG. 1 is a schematic system structure of a scalable in-memory object storing method based on DRAM/NVM hybrid memory devices according to the present invention.

According to one preferred embodiment, after dynamically re-allocating the available DRAM capacity for each said slab class according to the optimal DRAM allocation value for each said slab class, using a product of multiplying the access count of each said memory object in all the slab classes by an attenuation coefficient to update the access count of the memory object, wherein the attenuation coefficient $\in [0.1, 0.9]$, so as to ensure that the memory objects 100 satisfying the hotness threshold are indeed those having relatively high access hotness in a current time period. Without attenuation correction, some memory objects 100 may have relatively large radixes for their access counts in the early stage, and even if these memory objects 100 are not accessed in the late stage, the system can wrongly determine that these memory objects 100 have relatively high access hotness. For presenting this, the present method uses a product of the access count of each memory object 100 in all the slab classes and an attenuation coefficient to correct the access count of the memory object 100 every 105~108 accesses to the data objects. Preferably, an access count field is added to the metadata 110 of each memory object 100 for recording the access count of each memory object 100, and the access counts of the memory objects 100 in all the slab class are halved after a predetermined count of accesses to the data objects. Preferably, the present method enables the background thread every 107 accesses so as to halve the reading of the access counter for the memory objects 100 in all slab classes, so as to ensure that the memory objects 100 satisfying the hotness threshold are indeed those having relatively high access hotness in a current time period. Referring to FIG. 1, preferably, the metadata 110 of the memory object 100 include some original field. For example, the metadata 110 of the memory object 100 include at least one of a multi-queue forward pointer field 111, a multi-queue backward pointer field 112, a hash linked list pointer field 113, a time stamp field 114 and a reference counting field 115. The multi-queue forward pointer field 111 and the multi-queue backward pointer field 112 serve to form the dual linked list structure required by the multi-queue strategy. The hash linked list field 113 serves to link the memory objects 100 having hash collision under the same hash bucket into a single linked list. The time stamp field 114 serves to record the time of the memory object 100 being last accesses. The reference counting field 115 serves to record the number of times the memory object 100 have been used by the thread. Besides, the metadata 110 of the memory object 100 further include some other existing fields, which are omitted here for simplicity. Preferably, in the present invention, the metadata 110 of the memory object 100 have some additional fields for some specific functions. For example, the metadata of each memory object 100 have a memory medium type field 116 for marking the memory medium type to which the key-value data of the memory object 100 belong, namely DRAM or NVM. An access count field 117 is added to each the metadata 110 of the memory object 100 for recording the access count of each memory object 100. A KEY value signature field 118 is added to each the metadata 110 of the memory object 100 for recording the 32-digit hash value obtained by performing signature operation on the KEY value of the memory object 100, which value is used for quick match of the memory object 100, thereby improving the efficiency for searching the memory objects 100. A key-value data pointer field 119 is added to the metadata 110 of the memory object 100 for recording the storage address of the corresponding key-value data of the memory object 100. As shown in FIG. 1, the blocks containing numbers form a hash table 500. The hash table 500 may be used to manage and search the memory objects 100.

According to one preferred embodiment, DRAM re-allocation is performed cyclically across various slab classes. The interval for performing DRAM re-allocation may be 10^5~10^8 accesses to the memory object 100. Preferably, the interval for performing DRAM re-allocation may be 10^7 accesses to the memory object 100.

According to one preferred embodiment, assuming that there are N slab classes in the present system, and the total DRAM capacity is D, preferably, at the beginning of each cycle, a set of Cost[i][j](1≤i≤N, 0≤j≤D) is calculated. The value of Cost[i][j] represents the system cost when the DRAM capacity caused by the $i^{th}$ slab class allocated to the $i^{th}$ slab class is j. Taking the $i^{th}$ slab class for example, assuming that the slab class include T memory objects 100, and the access counts corresponding to these memory objects 100 are a[1] through a[T] from high to low, when the DRAM capacity allocated by the slab class is j, the total number of the memory objects 100 the DRAM can accommodate is t and S[i] represents the memory chunk the slab class allocates for the memory objects 100, so the value of Cost[i][j] can be calculated using Equation 1:

$$\text{Cost}[i][j] = \left(\sum_{k=1}^{T} a[k] - \sum_{k=1}^{t} a[k]\right) * S[i] \quad \text{(Equation 1)}$$

Preferably, the total cost of the system TotalCost is calculated using Equation 2 calculating system. The value of d[i](0≤d[i]≤D) represents the DRAM capacity allocated to the $i^{th}$ slab class:

$$\text{TotalCost} = \sum_{i=1}^{N} \text{Cost}[i][d[i]] \quad \text{(Equation 2)}$$

Preferably, a set of d[i] is calculated using a dynamic programming algorithm (1≤i≤N), so that the set of d[i] minimizes a TotalCost value while upholding Equation 3. The value of the set of d[i] is the optimal DRAM allocation value required by each slab class:

$$\sum_{i=1}^{N} d[i] = D. \quad \text{(Equation 3)}$$

According to one preferred embodiment, the optimal DRAM allocation value of each slab class may be determined using Equation 1, Equation 2 and Equation 3 together.

Preferably, Equation 1 may be:

$$\text{Cost}[i][j] = \left(\sum_{k=1}^{T} a[k] - \sum_{k=1}^{t} a[k]\right) * S[i].$$

Cost[i][j] represents the system cost caused by the $i^{th}$ slab class when the DRAM capacity allocated to the $i^{th}$ slab class is j, where 1≤i≤N, 0≤j≤D. "N" represents a count of slab classes currently existing in the system. "D" represents a total DRAM capacity of the present system. "T" represents a number of the memory objects. The access counts corresponding to the memory objects are expressed as a[1] through a[T] in a descending order of the access counts. "t" represents a total count of the memory objects the DRAM accommodates. "S[i]" represents the size of the memory chunks allocated to the memory objects by the slab class.

Preferably, Equation 2 may be:

$$\text{TotalCost} = \sum_{i=1}^{N} \text{Cost}[i][d[i]].$$

"d[I]" represents the DRAM capacity allocated to the $i^{th}$ slab class by the system, 0≤d[i]≤D.

$$\sum_{i=1}^{N} d[i] = D.$$

Preferably, Equation 3 may be: The method calculates a set of d[i] so that the set of d[i] minimizes a TotalCost value while upholding Equation 3 and that a value of the set of d[i] is the optimal DRAM allocation value of each slab class. Preferably, the method calculates a set of d[i] using the dynamic programming algorithm so that the set of d[i] minimizes a TotalCost value.

Preferably, dynamic programming algorithm may comprise the following sub-steps:

(1) setting MinCost[i][j](1≤i≤N, 0≤j≤D) as +∞, setting i as 0, and turning to Step (2), wherein MinCost[i] [j] represents the system cost when the total DRAM capacity allocated to the 1st to the $i^{th}$ slab classes is j;

(2) incrementing i by 1; if i is smaller or equal to N, setting j as −1, turning to Step (3); and if i is greater than N, turning to Step (6);

(3) incrementing j by 1; if j is smaller than or equal to D, setting k as −1, turning to Step (4); and if j is greater than D, turning to Step (2);

(4) incrementing k by 1; if k is smaller than or equal to j, turning to Step (5); and if k is greater than j, turning to Step (3);

(5) summing MinCost[i−1][j−k] and Cost[i][k]; if the sum is smaller than MinCost[i][j], setting the value of MinCost [i][j] as sum, and setting the value of Save[i][j] as k, and turning to Step (4); if the sum is greater than or equal to MinCost[i][j], turning to Step (4); Save[i][j] represents the DRAM capacity should be allocated for the $i^{th}$ slab class when the value of MinCost[i][j] is minimized;

(6) setting the temp as D, setting i as N+1, and turning to Step (7);

(7) decrementing i by 1; if i is greater than or equal to 1, turning to Step (8); and if i is smaller 1, turning to Step (9);

(8) setting dopt[i] as Save[i][temp], setting temp as the value equal to the difference between the original temp and dopt[i], and turning to Step (7);

(9) taking dopt[i](1≤i≤N) obtained in the previous step as the optimal DRAM allocation value.

Preferably, according to the optimal DRAM allocation value, the background thread is enabled to execute DRAM re-allocation, so as to dynamically re-allocate the available DRAM capacity for each slab class according to the optimal DRAM allocation value for that slab class.

According to one preferred embodiment, each slab class may be used to allocate memory chunks of a fixed size. Preferably, one slab class corresponds to only one size and different slab classes allocate memory chunks have different sizes. For example, one slab class may correspond to memory chunks each sized 8 kb while another slab class allocation is associated with memory chunks each sized 16 kb.

According to one preferred embodiment, the method may comprise: storing the metadata 110 and the key-value data of each memory object 100 separately. The metadata 110 may be separately stored in the dynamic random access memory 200. The key-value data may be stored in the DRAM/NVM hybrid memory pool. One part of the dynamic random access memory 200 may be exclusively used to store metadata. Another part of the dynamic random access memory 200 may work with the non-volatile memory 300 to from the DRAM/NVM hybrid memory pool.

Embodiment 2

This embodiment may be further improvements and/or supplements to Embodiment 1, and any feature that has been described is not repeated herein. Without conflict or contradiction, the entire and/or partial content of the preferred implementation manners of other embodiments may be used as a supplement to this embodiment.

The present embodiment discloses a scalable storage system that stores in-memory objects 100 using hybrid memory devices, or a hybrid-memory-based storage system, or a calculation system. The system is suitable for executing the steps of the method of the present invention, so as to achieve the expected technical effects.

Figure 2:
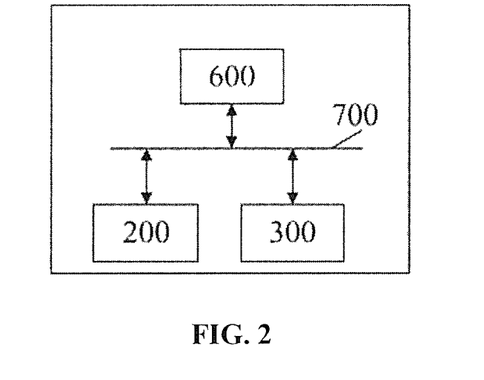
FIG. 2 is a block diagram showing hardware connection according to one preferred embodiment of a system of the present invention.

According to one preferred embodiment, as shown in FIG. 2, the system may comprise at least one of a dynamic random access memory 200, a non-volatile memory 300 and a processor 600. The processor 600 may be connected to the dynamic random access memory 200 and/or the non-volatile memory 300. The processor 600 may be connected to the dynamic random access memory 200 and/or the non-volatile memory 300 through a bus 700. The system is configured to allocate the memory device using a slab allocation mechanism, the allocation mechanism including a plurality of slab classes, and each said slab class being configured to allocate memory chunks of a fixed size, and to divide each slab class into a DRAM domain and an NVM domain; monitor an access count of each said memory object at an application-level and obtaining access hotness information of each said memory object at least based on the access count of each said memory object; and dynamically adjust a storage destination for corresponding key-value data in each slab class based on the access hotness information of each said memory object, so as to store the key-value data of the memory objects having relatively high access hotness in each said slab class into the DRAM domain, and store the key-value data of the memory objects having relatively low access hotness in each said slab class into the NVM domain. The system comprises: at least one processor 600 and at least one instruction. The at least one instruction is stored in the dynamic random access memory 200 and/or the non-volatile memory 300 and can be executed by at least one processor 600. Preferably, the system is so configured that any operation it performs may be executed by at least one processor 600.

Embodiment 3

This embodiment may be further improvements and/or supplements to Embodiment 1, and any feature that has been described is not repeated herein. This embodiment discloses, without conflict or contradiction, the entire and/or partial content of the preferred implementation manners of other embodiments may be used as a supplement to this embodiment.

According to one preferred embodiment, the method may comprise at least one of the following steps:

S100: building a DRAM/NVM hybrid memory pool, which involves: allocating memory for memory objects 100 using a slab-based allocation mechanism that divides memory allocation operation into various slab classes, each allocating memory chunks of a fixed size; and dividing each slab class into a DRAM domain and an NVM domain for memory allocation of DRAM and NVM, respectively, so that for each slab class, the DRAM domain stores the memory objects 100 having relatively great access hotness in that unit;

S200: optimizing the storage structure for the memory objects 100, which involves: separately storing metadata and key-value data of each memory, so that the metadata are stored in DRAM alone and the key-value data are stored in the DRAM/NVM hybrid memory pool; dynamically adjusting the storage destination of the key-value data by monitoring the access hotness information of all the memory objects 100 in a real-time manner; and adding a field in the metadata for storing the storage address of the key-value data;

S300: optimizing the efficiency for searching the memory objects 100, which involves: adding a KEY value signature field key_signature to the metadata, wherein the value in the field is a 32-digit hash value obtained by performing signature operation on the KEY value of the memory object 100 and used for achieving quick match of the memory object 100, thereby improving the efficiency for searching the memory objects 100; and S400: DRAM re-allocation, which involves: cyclically monitoring a utilization ratio of DRAM caused by each slab class, calculating each slab class the optimal DRAM allocation value, and then dynamically re-allocating the available DRAM capacity for each of the slab classes through the background thread.

According to one preferred embodiment, in Step S200, dynamically adjusting the storage destination of the key-value data comprises at least one of the following sub-steps:

S210: adding an access count field in the metadata of each memory object 100 for recording the access count of that memory object 100;

S220: where the access count of the memory object 100 exceeds the hotness threshold of the current slab class, migrating the memory object 100 to the DRAM domain of the current slab class, wherein the hotness threshold is dynamically adjusted using a hill climbing algorithm;

S230: where the memory space in the DRAM domain is insufficient for accommodating a memory object 100 that newly comes, expelling the memory object 100 having the lowest access hotness in the DRAM domain to the NVM domain, wherein the present method uses a multi-queue strategy to sort the memory objects 100 in the DRAM domain and in the NVM domain in terms of hotness, so as to determine which memory object 100 is the one having the lowest access hotness and should be expelled when the DRAM domain goes short of memory space; and/or S240: enabling background thread so as to halve the reading of the access counter of the memory objects 100 in all the slab classes after every 107 accesses to the data objects have been done, so as to ensure that the memory objects 100 satisfying the hotness threshold are indeed those having relatively high access hotness in a current time period.

According to one preferred embodiment, the hill climbing algorithm may comprise at least one of the following sub-steps:

using the algorithm to cyclically collect the average access count of the memory objects 100 in the DRAM domain of each slab class, so as to dynamically adjust the hotness threshold, wherein the cycle lasts for the time the slab class performs 106 access requests.

Given that the hotness threshold of the current slab class is taken as the threshold, the average access count of the memory objects 100 in the DRAM domain for the previous cycle is last_count, and the average access count of the memory objects 100 in the DRAM domain for the current cycle is curr_count. In this case, if curr_count>last_count, it indicates that the adjustment in the threshold for the previous cycle is beneficial, so the adjustment in the threshold for the current cycle remains the same as that for the previous cycle. In other words, if the threshold was lowered in the previous cycle, it is also lowered in the current cycle by decrementing the threshold by 1. If the threshold was increased in the previous cycle, it is increased in the current cycle. Otherwise, the threshold adjustment for the current cycle should be opposite to that for the previous cycle.

According to one preferred embodiment, the multi-queue strategy comprises the following sub-steps: maintaining a multi-queue structure for each slab class so as to manage the memory objects 100 in the DRAM domain and in the NVM domain of the current slab class. The multi-queue structure is a 16-levels queue structure, numbered 0-15. The memory object 100 is placed in the corresponding queue according to the value in the access count field of its metadata. Particularly, the memory objects 100 having a value in the access count field ranging between $2^i$ and $2^{i+1}$ will be placed in the $i^{th}$-level queue, and the memory objects 100 having the value in the access count field greater than $2^{15}$ are all placed in the $15^{th}$-level queue. The higher the level of the queue is, the greater the access hotness of the memory object 100 is. Every queue level is actually a least recently used linked list 400. After accessed, the memory object 100 is placed at the top of the linked list, and the bottom of the linked list corresponds to the memory object 100 having the lowest access hotness in the current queue.

Figure 4:
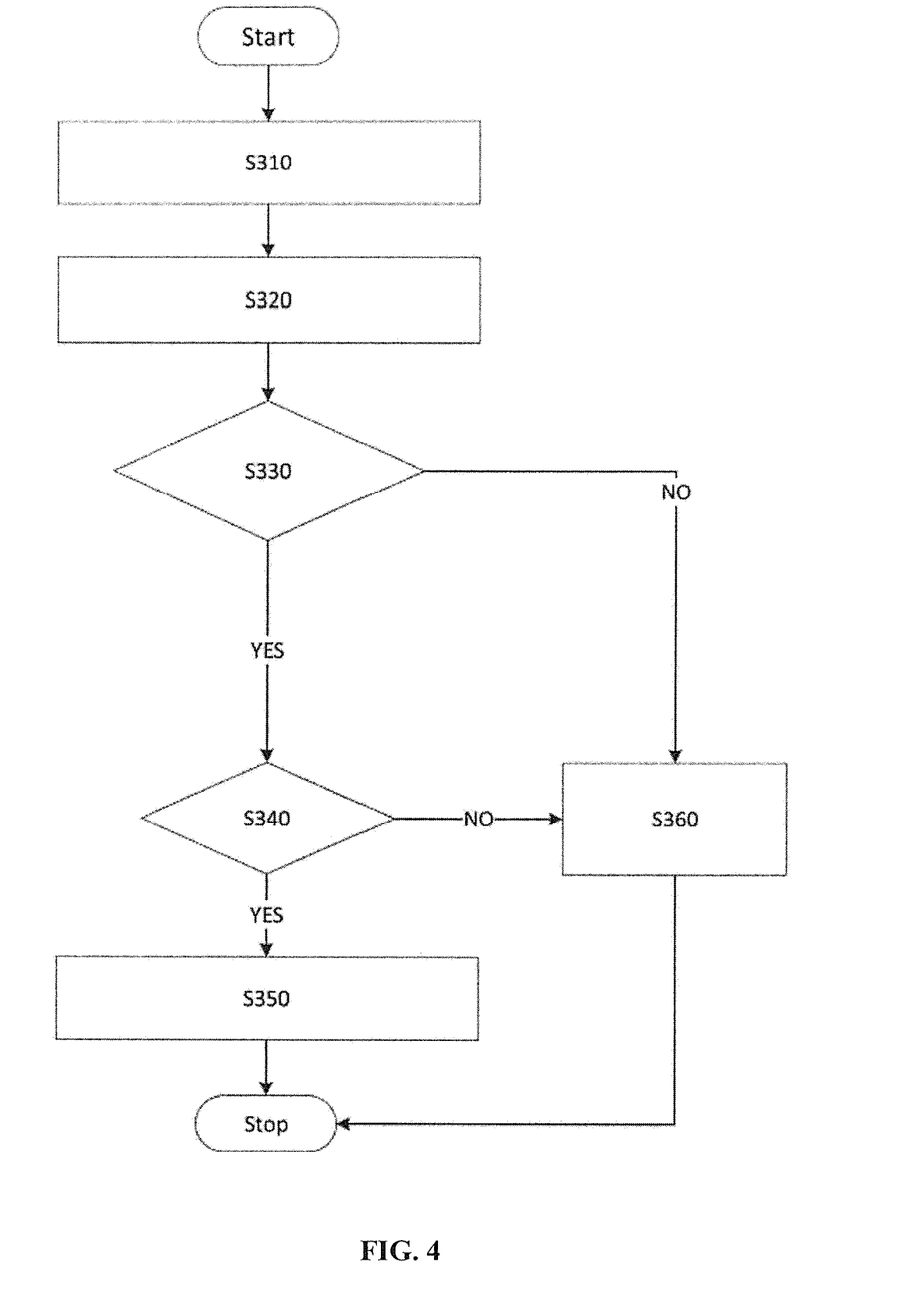
FIG. 4 a flowchart of searching for a data object.

According to one preferred embodiment, the method may comprise: adding a KEY value signature field key_signature to the metadata, wherein the value in the field is a 32-digit hash value obtained by performing signature operation on the KEY value of the memory object 100 using a second hash function and used for achieving quick match of the memory object 100, thereby improving the efficiency for searching the memory objects 100. Preferably, referring to FIG. 4, search for the memory objects 100 may comprise the following sub-steps:

S310: calculating a hash bucket ID using a first hash function through the KEY value to be searched so as to search the corresponding hash bucket list;

S320: calculating the signature value using a second hash function different from the first hash function through the KEY value, and turning to step S330;

S330: determining whether a memory object 100 having a KEY value signature field as the signature value has been found, if yes, turning to S340, and if not, turning to S360;

S340: according to the field data_ptrof of the memory object 100, reading the complete KEY value from the memory for matching, if the matching succeeds, turning to S350, and if the matching fails, turning to S360;

S350: accessing the key-value data through the key-value data address stored in the metadata so as to find the required memory object 100, and ending the search process;

S360: determining that there is no objects corresponding to the KEY value in the system, and ending the search process, wherein as shown in FIG. 1, the hash bucket #2 contains a linked list composed of different memory objects 100.

According to one preferred embodiment, Step S400 may comprise the following sub-steps:

S410: cyclically performing DRAM re-allocation across slab classes with a cycle lasting for 107 accesses to the memory objects 100;

S420: assuming that there are N slab classes in the system, and the total DRAM capacity is D, preferably, at the beginning of each cycle, a set of Cost[i][j] (1≤i≤N, 0≤j≤D) is calculated. The value of Cost[i][j] represents the system cost when the DRAM capacity caused by the $i^{th}$ slab class allocated to the $i^{th}$ slab class is j. Taking the $i^{th}$ slab class for example, assuming that the slab class include T memory objects 100, and the access counts corresponding to these memory objects 100 are a[1] through a[T] from high to low, when the DRAM capacity allocated by the slab class is j, the total number of the memory objects 100 the DRAM can accommodate is t and S[i] represents the memory chunk the slab class allocates for the memory objects 100, so the value of Cost[i][j] can be calculated using Equation 1:

$$\text{Cost}[i][j] = \left(\sum_{k=1}^{T} a[k] - \sum_{k=1}^{t} a[k]\right) * S[i]; \quad \text{(Equation 1)}$$

S430: using Equation 2 to calculate the total cost of the system TotalCost, wherein d[i](0≤d[i]≤D) represents the DRAM capacity allocated to the $i^{th}$ slab class:

$$\text{TotalCost} = \sum_{i=1}^{N} \text{Cost}[i][d[i]]; \quad \text{(Equation 2)}$$

S440: for which a set of d[i] is calculated using a dynamic programming algorithm (0≤i≤N), so that the set of d[i] minimizes a TotalCost value while upholding Equation 3, wherein the value of the set of d[i] is the optimal DRAM allocation value required by each slab class:

$$\sum_{i=1}^{N} d[i] = D; \quad \text{(Equation 3)}$$

and

S450: according to the optimal DRAM allocation value, enabling the background thread to perform DRAM re-allocation, so as to dynamically re-allocate the DRAM capacity for each slab class according to the optimal DRAM allocation value for each slab class.

It should be noted that the above specific embodiments are exemplary, persons skilled in the art can devise various solutions under the inspiration of the disclosed content of the present invention, and the solutions also belong to the disclosed scope of the present invention and fall into the protection scope of the present invention. Persons skilled in the art shall understand that the specification and its drawings of the present invention are exemplary and do not limit the claims. The protection scope of the present invention is limited by the claims and its equivalents.

What is claimed is:

1. A method of scalable storage for in-memory objects using hybrid memory devices, it particularly relates to a method of storage for in-memory objects using hybrid memory devices, a hybrid memory device comprises a dynamic random access memory (DRAM) and a non-volatile memory (NVM), wherein the method comprising steps of:

executing an operation of allocating the hybrid memory device using a slab-based allocation mechanism, the slab-based allocation mechanism including a plurality of slab classes, and each said slab class being responsible to allocate memory chunks of a fixed size, and to divide each slab class into a DRAM domain and a NVM domain;

monitoring an access count of each said in-memory object at an application level and obtaining access hotness information of each said in-memory object at least based on the access count of each said in-memory object;

dynamically adjusting a storage destination for corresponding key-value data in each slab class based on the access hotness information of each said in-memory object, so as to store the corresponding key-value data of the in-memory objects having relatively determined to have high access hotness in each said slab class into the DRAM domain, and store the corresponding key-value data of the in-memory objects determined to have low access hotness in each said slab class into the NVM domain; and storing metadata and the key-value data of each said in-memory object separately, so that the metadata are stored in the DRAM and the key-value data are stored in a DRAM/NVM hybrid memory pool, in which one part of the DRAM dedicatedly stores the metadata, while another part of the DRAM and the NVM jointly form the DRAM/NVM hybrid memory pool;

wherein each said slab class has a corresponding hotness threshold, and the hotness thresholds for different said slab classes are independent of each other; and wherein the method sorts the in memory objects in the DRAM domain and in the NVM domain of each said slab class, respectively, in terms of access hotness using a multi-queue strategy, so as to obtain the access hotness information of each said in-memory object, and wherein the method comprises:

maintaining a multi-queue structure for each said slab class for management of the in-memory objects in the DRAM domain and in the NVM domain of each slab class;

given that the multi-queue structure is a 16-levels queue structure, with the levels numbered 0-15, wherein, placing the in-memory objects having values of an access count field ranging between $2^i$ and $2^{i+1}$ in the $i^{th}$-level queue, and placing all the in-memory objects having the values greater than $2^{15}$ in the $15^{th}$-level queue, the in-memory objects in higher levels are determined to have higher access hotness;

given that each said queue is a least recently used linked list, placing each said in-memory object just accessed at a top of the least recently used linked list, so that a bottom of the linked list corresponds to the memory object that has the lowest access hotness in the current queue; and taking a sort result of each said in-memory object in the multi-queue structure in terms of access hotness as the access hotness information.

2. The method of claim 1, wherein dynamically adjusting the storage destination for the corresponding key-value data in each said slab class based on the access hotness information of each said in-memory object comprises:

when the access count recorded in an access count field of the corresponding memory object exceeds the hotness threshold of the corresponding slab class, migrating the key-value data of the corresponding memory object in the NVM domain of the slab class to the DRAM domain of the slab class; and when a memory space in the DRAM domain of the corresponding slab class is insufficient for the key-value data of a said in-memory object that newly comes, expelling the key-value data of the memory object having the lowest access hotness in the DRAM domain of the slab class to the NVM domain of the same slab class.

3. The method of claim 2, wherein the method further comprises dynamically adjusting the hotness threshold of the corresponding slab class using a hill climbing algorithm, and wherein the method comprises:

cyclically counting an average of the access counts of the in-memory objects in the DRAM domain of each said slab class using the hill climbing algorithm, so as to dynamically adjust the hotness threshold of the slab class accordingly;

where the average of the access counts of the in-memory objects in the DRAM domain of the slab class corresponding to a current cycle is greater than the average of the access counts of the in-memory objects in the DRAM domain of the slab class in a previous cycle, keeping adjustment in the hotness threshold for the current cycle consistent with adjustment in the hotness threshold for the previous cycle; and/or where the average of the access counts of the in-memory objects in the DRAM domain of the slab class corresponding to the current cycle is smaller than or equal to the average of the access counts of the in-memory objects in the DRAM domain of the slab class in the previous cycle, making the adjustment in the hotness threshold for the current cycle opposite to the adjustment in the hotness threshold for the previous cycle.

4. The method of claim 3, wherein the method further comprises the steps of:

cyclically monitoring a utilization ratio of DRAM caused by each said slab class and calculating an optimal DRAM memory allocation value for each said slab class accordingly; and dynamically re-allocating available DRAM memory capacity for each said slab class according to the optimal DRAM memory allocation value for each said slab class.

5. The method of claim 4, wherein, after dynamically re-allocating the available DRAM memory capacity for each said slab class according to the optimal DRAM memory allocation value for each said slab class, using a product of multiplying the access count of each said in-memory object in all the slab classes by an attenuation coefficient to update the access count of the memory object, wherein the attenuation coefficient∈[0.1, 0.9], so as to ensure that the in-memory objects satisfying the hotness threshold are indeed those determined to have high access hotness in a current time period.

6. The method of claim 5, wherein, dynamically re-allocating the available DRAM memory capacity for each said slab class according to the optimal DRAM memory allocation value for each said slab class is performed in a cyclical manner;

enabling a background thread to execute DRAM memory re-allocation according to the optimal DRAM memory allocation value, so as to dynamically re-allocate the available DRAM memory capacity for each said slab class according to the optimal DRAM memory allocation value for each said slab class;

wherein, the optimal DRAM memory allocation value for each said slab class is obtained using an Equation 1, an Equation 2 and an Equation 3 together:

in which the Equation 1 is:

$$\text{Cost}[i][j] = \left(\sum_{k=1}^{T} a[k] - \sum_{k=1}^{t} a[k]\right) * S[i],$$

where Cost[i][j] represents a cost of a system implementing the method caused by the slab class when the DRAM memory capacity allocated to the slab class is j, where $1 \le i \le N$, $0 \le j \le D$; N represents a number of slab classes currently existing in the system; D represents a total DRAM memory capacity of the present system, T represents a count of the in-memory objects, the access counts corresponding to the in-memory objects are expressed as a[1] through a[T] in a descending order of the access counts; t represents a total number of the in-memory objects the DRAM is able to accommodate, and S[i] represents the size of the memory chunks allocated to the in-memory objects by the slab class;

the Equation 2 is:

$$\text{TotalCost} = \sum_{i=1}^{N} \text{Cost}[i][d[i]],$$

where d[i] represents the DRAM memory capacity allocated to the ith slab class by the system, where $0 \le d[i] \le D$; and the Equation 3 is:

$$\sum_{i=1}^{N} d[i] = D,$$

for which a set of d[i] is calculated using a dynamic programming algorithm so that the set of d[i] minimizes a TotalCost value while upholding Equation 3 and that a value of the set of d[i] is the optimal DRAM memory allocation value of each said slab class.

7. A storage system of scalable storage for in-memory objects using hybrid memory devices, it particularly relates to a storage system of storage for in-memory objects using hybrid memory devices, the said system comprises a dynamic random access memory (DRAM) and a non-volatile memory (NVM), wherein the system is configured to:

execute an operation of allocating the hybrid memory device using a slab-based allocation mechanism, the slab-based allocation mechanism including a plurality of slab classes, and each said slab class being responsible to allocate memory chunks of a fixed size, and to divide each slab class into a DRAM domain and a NVM domain;

monitor an access count of each said in-memory object at an application level and obtaining access hotness information of each said in-memory object at least based on the access count of each said in-memory object;

dynamically adjust a storage destination for corresponding key-value data in each slab class based on the access hotness information of each said in-memory object, so as to store the corresponding key-value data of the in-memory objects determined to have high access hotness in each said slab class into the DRAM domain, and store the key-value data of the in-memory objects determined to have low access hotness in each said slab class into the NVM domain; and storing metadata and the key-value data of each said in-memory object separately, so that the metadata are stored in the DRAM and the key-value data are stored in a DRAM/NVM hybrid memory pool, in which one part of the DRAM dedicatedly stores the metadata, while another part of the DRAM and the NVM jointly form the DRAM/NVM hybrid memory pool;

wherein each said slab class has a corresponding hotness threshold, and the hotness thresholds for different said slab classes are independent of each other; and wherein the method sorts the in-memory objects in the DRAM domain and in the NVM domain of each said slab class, respectively, in terms of access hotness using a multi-queue strategy, so as to obtain the access hotness information of each said in-memory object, and wherein the method comprises:

maintaining a multi-queue structure for each said slab class for management of the in-memory objects in the DRAM domain and in the NVM domain of each slab class;

given that the multi-queue structure is a 16-levels queue structure, with the levels numbered 0-15, wherein, placing the in-memory objects having values of each access count field ranging between $2^i$ and $2^{i+1}$ in the $i^{th}$-level queue, and placing all the in-memory objects having the values greater than $2^{15}$ in the $15^{th}$-level queue, the in-memory objects in higher levels are determined to have higher access hotness;

given that each said queue is a least recently used linked list, placing each said in-memory object just accessed at a top of a linked list, so that a bottom of the linked list corresponds to the memory object that has the lowest access hotness in the current queue; and taking a sort result of each said in-memory object in the multi-queue structure in terms of access hotness as the access hotness information.

\* \* \* \* \*